(No Model.)
C. SHERMAN.
FLOWER POT.
No. 599,263. Patented Feb. 15, 1898.
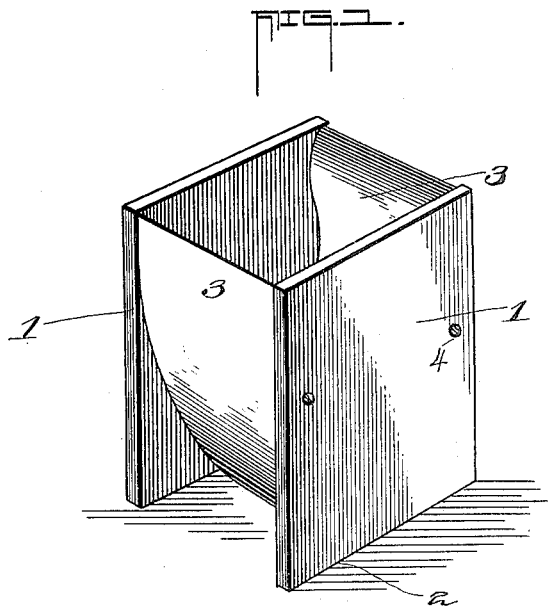
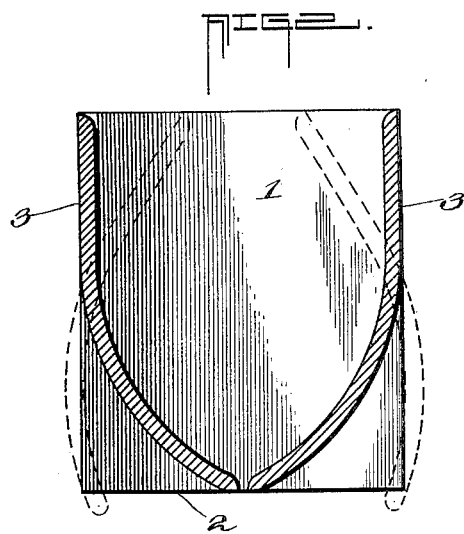
Witnesses
Geo. C. Byrne
Victor J. Evans
Inventor
Charles Sherman.
By John Wedderburn
Attorney

UNITED STATES PATENT OFFICE.

CHARLES SHERMAN, OF YARMOUTH, CANADA.

FLOWER-POT.

SPECIFICATION forming part of Letters Patent No. 599,263, dated February 15, 1898.

Application filed August 17, 1897. Serial No. 648,515. (No model.)

*To all whom it may concern:*

Be it known that I, CHARLES SHERMAN, a citizen of the United States of America, residing at Yarmouth, in the Province of Nova Scotia and Dominion of Canada, have invented certain new and useful Improvements in Flower-Pots; and I do hereby declare the following to be a full, clear, and exact description of the invention, such as will enable others skilled in the art to which it appertains to make and use the same.

This invention relates to flower-pots, and has for its object to provide a simple, cheap, and durable flower-pot which is especially adapted for transplanting purposes.

The detailed objects and advantages of the invention will appear in the course of the subjoined description.

The invention consists in an improved flower-pot embodying certain novel features and details of construction hereinafter specifically set forth, illustrated in the drawings, and incorporated in the claims hereto appended.

In the accompanying drawings, Figure 1 is a perspective view of a flower-pot constructed in accordance with the present invention; and Fig. 2 is a vertical section through the same, showing in dotted lines the position of the pivoted sides of the pot when adjusted for depositing the plant.

Similar numerals of reference indicate corresponding parts in both views.

The improved flower-pot contemplated in this invention comprises four sides extending substantially at right angles to each other. Two of these sides (indicated at 1) are preferably rectangular in shape, having horizontal lower edges 2, which form rests by means of which the pot may be set upon a suitable shelf or other support.

In connection with the rectangular and parallel sides 1 a pair of oblique and downwardly-converging sides 3 are employed. These sides 3 are preferably curved from their upper toward their lower ends, and when the pot is in condition for use the said lower ends of the sides 3 touch or are brought into close approximate relation to each other for supporting the earth or soil in which the plant is embedded. The sides 3 are pivotally mounted between the sides 1, being connected to the sides 1 by means of pins, screws, or equivalent fasteners 4, the same being arranged slightly above the centers of the sides 3, so as to give a wider range of movement to the lower edges of the sides than to the upper edges thereof.

The improved flower-pot hereinabove described is preferably constructed of some tough wood which will permit of necessary handling without danger of fracture. It will, however, be apparent that any suitable material may be employed in the construction of the flower-pot. In setting out the plant the pot is filled with proper earth or soil and the plant is then embedded therein. When the plant has reached the desired degree of maturity, it may be transplanted by grasping the upper edges of the sides 3 and moving the same toward each other. This effects a separation or moving apart of the lower edges of the sides 3, whereupon by tapping the flower-pot the earth containing the plant will become dislodged and will pass out through the bottom of the pot into a second pot or into the ground prepared to receive it.

It will thus be seen that the improved flower-pot may be used repeatedly, and when properly constructed will last from season to season. It will of course be understood that the improved flower-pot hereinbefore described is susceptible of various changes in the form, proportion, and minor details of construction, which may be resorted to without departing from the principle or sacrificing any of the advantages of the invention.

Having thus described my invention, what I claim as new, and desire to secure by Letters Patent, is—

1. A flower-pot, having sides arranged to move apart at their lower ends, substantially as and for the purpose described.

2. A flower-pot, having oppositely-located sides pivotally mounted at points intermediate their height, substantially as described.

3. A flower-pot, comprising two rectangular sides having horizontal lower edges and two downwardly-converging sides movably mounted between the first-named sides and adapted to be spread as to their lower ends, substantially as described.

4. In a flower-pot, the combination with oppositely-located stationary sides, of oppositely-located curved sides converging toward their lower ends and pivotally connected intermediate their height to the stationary sides, substantially as described.

5. A flower-pot, comprising sides connected in such manner as to allow their lower ends to be spread apart and their upper ends to be moved toward each other, substantially as described.

In testimony whereof I have signed this specification in the presence of two subscribing witnesses.

CHARLES SHERMAN.

Witnesses:
ROBERT S. EAKINS,
L. WOOLSEY BINGAY.